(12) United States Patent
He et al.

(10) Patent No.: US 12,422,579 B2
(45) Date of Patent: *Sep. 23, 2025

(54) SYSTEM AND METHOD FOR FORMING A SEISMIC VELOCITY MODEL AND IMAGING A SUBTERRANEAN REGION

(71) Applicant: SAUDI ARABIAN OIL COMPANY, Dhahran (SA)

(72) Inventors: Weiguang He, Beijing (CN); Yujin Liu, Beijing (CN); Song Han, Beijing (CN)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 469 days.

This patent is subject to a terminal disclaimer.

(21) Appl. No.: 17/937,443

(22) Filed: Sep. 30, 2022

(65) Prior Publication Data
US 2024/0125955 A1    Apr. 18, 2024

(51) Int. Cl.
*G01V 1/28*    (2006.01)
*G01V 1/30*    (2006.01)

(52) U.S. Cl.
CPC .............. *G01V 1/282* (2013.01); *G01V 1/303* (2013.01); *G01V 2210/614* (2013.01); *G01V 2210/6161* (2013.01); *G01V 2210/6222* (2013.01)

(58) Field of Classification Search
CPC .. G01V 1/282; G01V 1/303; G01V 2210/614; G01V 2210/6161; G01V 2210/6222
See application file for complete search history.

(56) References Cited

U.S. PATENT DOCUMENTS 11,048,001 B2    6/2021  Zhang et al.
11,092,708 B2*   8/2021  Lu ............................ G01V 1/38
(Continued)

FOREIGN PATENT DOCUMENTS

AU    2014343482 A1   6/2016
CN      108680957 B    8/2019
(Continued)

OTHER PUBLICATIONS

Van Leeuwen, T. et al., "A correlation-based misfit criterion for wave-equation traveltime tomography"; Geophysical Journal International; vol. 182, Issue 3; pp. 1383-1394; Sep. 2010 (12 pages).
(Continued)

*Primary Examiner* — Elias Desta
(74) *Attorney, Agent, or Firm* — Osha Bergman Watanabe & Burton LLP

(57) ABSTRACT

A method for forming an image of a subterranean region of interest, using an observed seismic dataset, a seismic velocity model and a simulated seismic dataset based in part, on the seismic velocity model is provided. This method includes forming trace pairs from the simulated and observed seismic dataset, wherein each of the trace pairs comprises of an observed trace and a simulated trace. An objective function is formed based on a penalty function and a phase cross-correlation between the observed and simulated seismic trace of each of the trace pairs. This method further includes determining an extremum of the objective function and a seismic velocity increment based on the extremum. The seismic velocity model is updated by combining the seismic velocity increment and the seismic velocity model and the image of the subterranean region of interest is formed based in part, on the seismic velocity model.

20 Claims, 11 Drawing Sheets

(56) References Cited

U.S. PATENT DOCUMENTS 11,835,671 B2 * 12/2023 Zhu .................... G01V 1/364
11,971,513 B2 * 4/2024 He ..................... G01V 1/301

FOREIGN PATENT DOCUMENTS

CN        111239806 B      6/2021
WO     2019/046550 A1      3/2019
WO     2019/186286 A1     10/2019

OTHER PUBLICATIONS

Schimmel, Martin, "Phase Cross-Correlations: Design, Comparisons, and Applications"; Bulletin of the Seismological Society of America; vol. 89, Issue 5; pp. 1366-1378; Oct. 1999 (13 pages).

Liu, Yujin et al., "Source location with cross-coherence migration"; Geophysics; vol. 85, Issue 4; pp. KS127-KS138; Jul.-Aug. 2020 (12 pages).

Luo, Y. et al., "Wave-equation traveltime inversion"; Geophysics; vol. 56, Issue 5; pp. 645-653; May 1991 (9 pages).

Chi, Benxin et al., "Full waveform inversion method using envelope objective function without low frequency data"; Journal of Applied Geophysics; vol. 109; pp. 36-46; Oct. 2014 (11 pages).

Yuan, Yanhua O. et al., "The exponentiated phase measurement, and objective-function hybridization for adjoin waveform tomography"; Geophysical Journal International; vol. 221, Issue 2; pp. 1145-1164; May 2020 (20 pages).

* cited by examiner

SYSTEM AND METHOD FOR FORMING A SEISMIC VELOCITY MODEL AND IMAGING A SUBTERRANEAN REGION

BACKGROUND

Seismic surveys are frequently conducted by participants in the oil and gas industry. Seismic surveys are conducted over subterranean regions of interest during the search for, and characterization of, hydrocarbon reservoirs. In seismic surveys, a seismic source generates seismic waves which propagate through the subterranean region of interest are and detected by seismic receivers. Typically, both seismic sources and seismic receivers are located on the earth's surface. The seismic receivers detect and store a time-series of samples of earth motion caused by the seismic waves. The collection of time-series of samples recorded at many receiver locations generated by a seismic source at many source locations constitute a seismic data set.

To determine earth structure, including the presence of hydrocarbons, the seismic data set may be processed. Processing a seismic data set includes a sequence of steps designed to correct for near-surface effects, attenuate noise, compensate of irregularities in the seismic survey geometry, calculate a seismic velocity model, image reflectors in the subterranean, calculate a plurality of seismic attributes to characterize the subterranean region of interest, and aid in decisions governing if, and where, to drill for hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for forming an image of a subterranean region of interest, using an observed seismic dataset, a seismic velocity model and a simulated seismic dataset based in part, on the seismic velocity model is provided. This method includes forming trace pairs from the simulated and observed seismic dataset, wherein each of the trace pairs comprises of an observed trace and a simulated trace. An objective function is formed based on a penalty function and a phase cross-correlation between the observed and simulated seismic trace of each of the trace pairs. This method further includes determining an extremum of the objective function and a seismic velocity increment based on the extremum. The seismic velocity model is updated by combining the seismic velocity increment and the seismic velocity model and the image of the subterranean region of interest is formed based in part, on the seismic velocity model.

In general, in one aspect, embodiments relate to a non-transitory computer readable medium storing instructions executable by a computer processor, the instructions including functionality for obtaining an observed seismic dataset and a seismic velocity for a region of interest, simulating, using a computer processor, a simulated seismic dataset based, at least in part, on the seismic velocity model, forming, using the computer processor, trace pairs from the simulated seismic dataset wherein each trace pair comprise of an observed seismic trace and a simulated seismic trace, forming, using the computer processor, and objective function based, at least in part, on a penalty function and a phase cross-correlation between the observed seismic trace and the simulated seismic trace of each of the trace pairs, finding, using the computer processor, an extremum of the objective function and a seismic velocity increment based on the extremum, forming, using the computer processor, an updated seismic velocity model by combining the seismic velocity increment and the seismic velocity model, and forming using the computer processor, the image of the subterranean region of interest, based at least in part on the updated seismic velocity model.

In general, in one aspect, embodiments relate to a system for forming an image of subterranean region of interest. The system comprises of a seismic source, a plurality of seismic receivers, and a seismic processor. The seismic processor from the system is configured to obtain an observed seismic dataset and a seismic velocity model for a subterranean region of interest, simulate a simulated seismic dataset based, at least in part, on the seismic model, form trace pairs from the simulated seismic dataset, wherein each trace pair comprises an observed seismic trace and a simulated seismic trace, form an objective function based, at least in part, on a penalty function and a phase cross-correlation between the observed seismic trace and the simulated seismic trace, find the extremum of the objective function, determine a seismic velocity increment based, at least in part, on the extremum, form an updated seismic velocity model by combining the seismic velocity increment and the seismic velocity model and form the image of the subterranean region of interest based, at least in part, on the updated seismic velocity model.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The embodiments disclosed herein describe methods and systems for updating a seismic velocity model of a subterranean region of interest. The methods include determining a phase cross-correlation between a plurality of traces from an observed seismic dataset and of a plurality of traces from a simulated seismic dataset, forming a penalized objective function using the phase cross-correlation between the observed and simulated seismic traces, and finding an extremum of the objective function. The systems include a seismic acquisition system for acquiring seismic survey data and a seismic processor for processing the seismic dataset using the disclosed methods.

Figure 1:
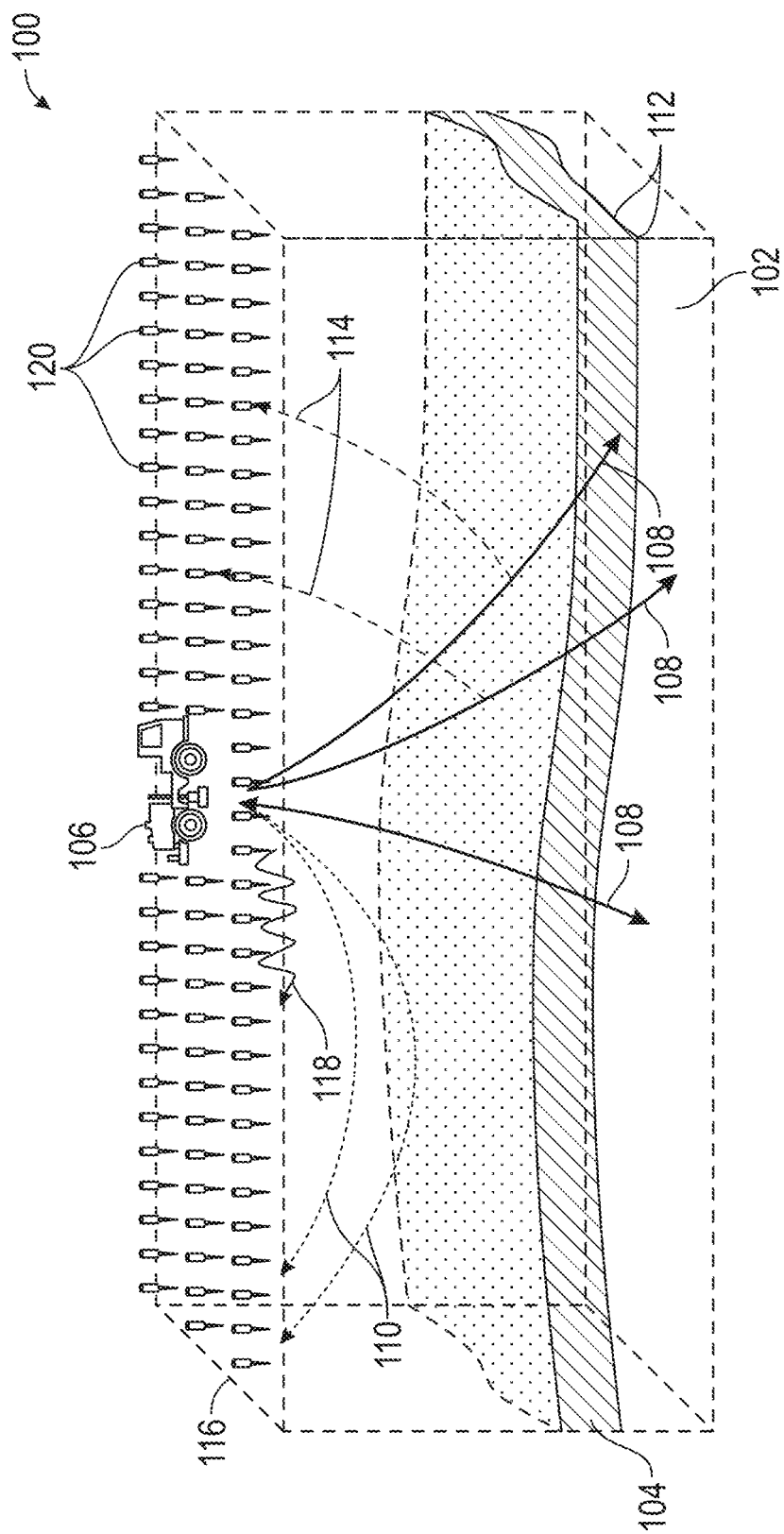
FIG. 1 depicts a seismic survey in accordance with one or more embodiments.

FIG. 1 shows a seismic survey (100) of a subterranean region of interest (102), which may contain a hydrocarbon reservoir (104). In some cases, the subterranean region of interest (102) may lie beneath a lake, sea, or ocean. In other cases, the subterranean region of interest (102) may lie beneath an area of dry land. The seismic survey (100) may utilize a seismic source (106) that generates radiated seismic waves (108). The type of seismic source (106) may depend on the environment in which it is used, for example on land the seismic source (106) may be a vibroseis truck or an explosive charge, but in water the seismic source (106) may be an airgun. The radiated seismic waves (108) may return to the Earth's surface (116) as refracted seismic waves (110) or may be reflected by geological discontinuities (112) and return to the surface as reflected seismic waves (114). The radiated seismic waves (108) may propagate along the surface as Rayleigh waves or Love waves, collectively known as "ground-roll" (118). Vibrations associated with ground-roll (118) do not penetrate far beneath the Earth's surface (116) and hence are not influenced, nor contain information about, portions of the subterranean region of interest (102) where hydrocarbon reservoirs (104) are typically located. Seismic receivers (120), located on or near the Earth's surface (116), detect reflected seismic waves (114), refracted seismic waves (110) and ground-roll (118).

In accordance with one or more embodiments, the refracted seismic waves (110), reflected seismic waves (114), and ground-roll (118) generated by a single activation of the seismic source (106) are recorded by a seismic receiver (120) as a time-series representing the amplitude of ground-motion at a sequence of discreet sample times. Usually the origin of the time-series, denoted t=0, is determined by the activation time of the seismic source (106). This time-series may be denoted a seismic "trace". The seismic receivers (120) are positioned at a plurality of seismic receiver locations which we may denote $(x_r, y_r)$ where x and y represent orthogonal axes on the Earth's surface (116) above the subterranean region of interest (102). Thus, the plurality of seismic traces generated by activations of the seismic source (106) at a single location may be represented as a three-dimensional "3D" volume with axes $(x_r, y_r, t)$ where $(x_r, y_r)$ represents the location of the seismic receiver (120) and t denotes the time sample at which the amplitude of ground-motion was measured.

However, a seismic survey (100) may include recordings of seismic waves generated by a seismic source (106) sequentially activated at a plurality of seismic source locations denoted $(x_s, y_s)$. In some cases, this may be achieved using a single seismic source (106) that is moved to a new location between activations. In other cases, a plurality of seismic sources (106) positioned at different locations may be used. Irrespective of how they are acquired, all the seismic traces acquired by a seismic survey (100) may be represented as a five-dimensional volume, with coordinate axes $(x_s, y_s, x_r, y_r, t)$, and called a "seismic dataset".

When a seismic dataset is acquired by activating physical seismic sources (106) and recording the actual resulting vibrations of the Earth using physical seismic receivers, the seismic dataset may be termed an "observed seismic dataset" and the component seismic traces "observed seismic traces". However, a seismic dataset may be simulated by solving the acoustic, elastic, or viscoelastic wave equations for at least one simulated seismic source and a plurality of seismic receiver locations. Typically, the solving is performed using a large capacity computer system. The resulting seismic dataset may be termed a "simulated seismic dataset" and the component seismic traces "simulated seismic traces".

Figure 2:
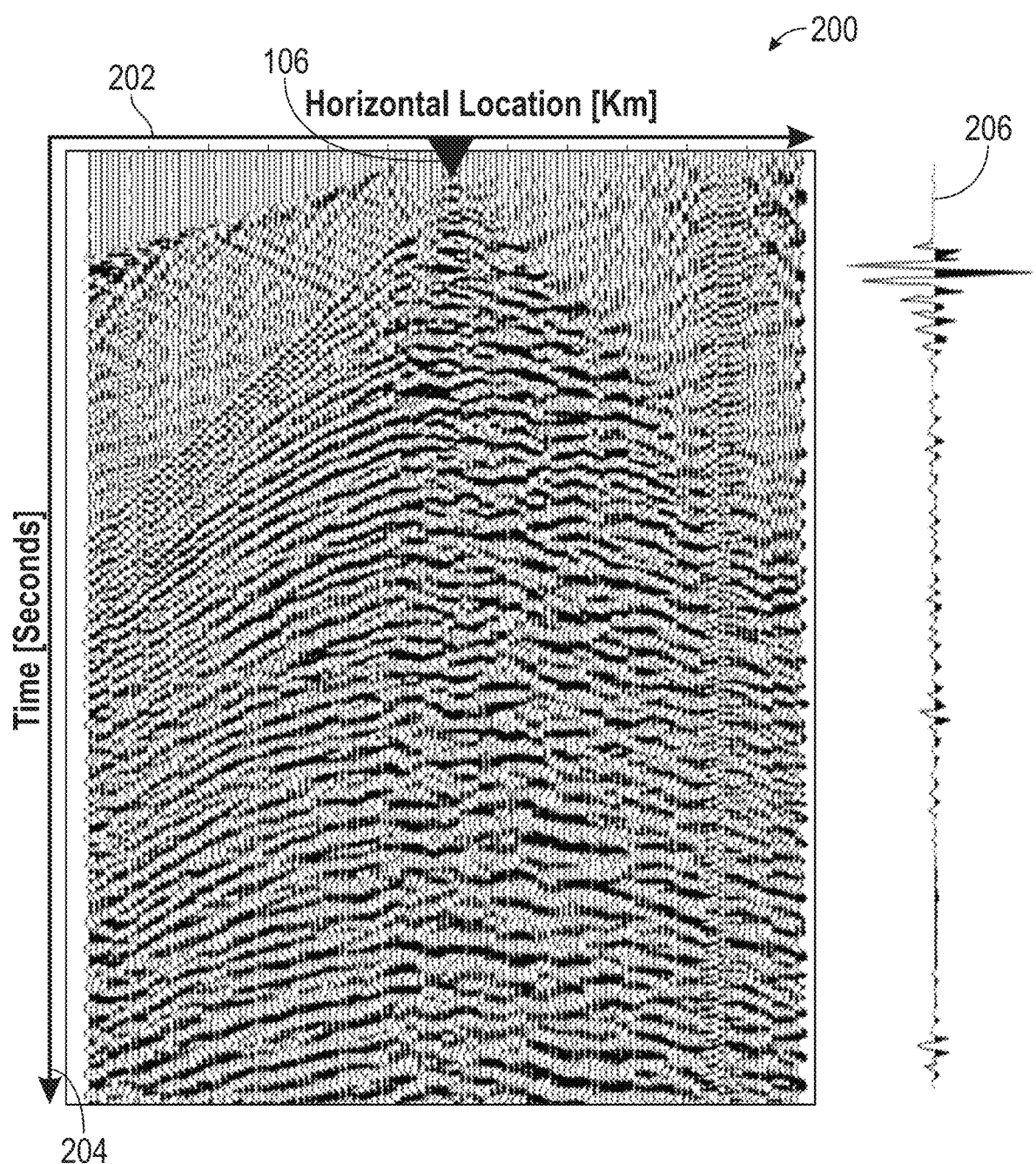
FIG. 2 shows a seismic dataset in accordance with one or more embodiments.

FIG. 2 shows a portion of a seismic dataset (200) in accordance with one or more embodiments. The portion of a seismic dataset (200) comprises a plurality of seismic traces (206) for a single seismic source (106) activation position. Each seismic trace (206) runs vertically with the recording time of each sample indicated by the vertical axis (204). Each seismic trace (206) is displayed at a position on the horizon axis (202) corresponding to the horizontal location of the seismic receiver (120) that recorded the seismic trace (206).

Figure 3:
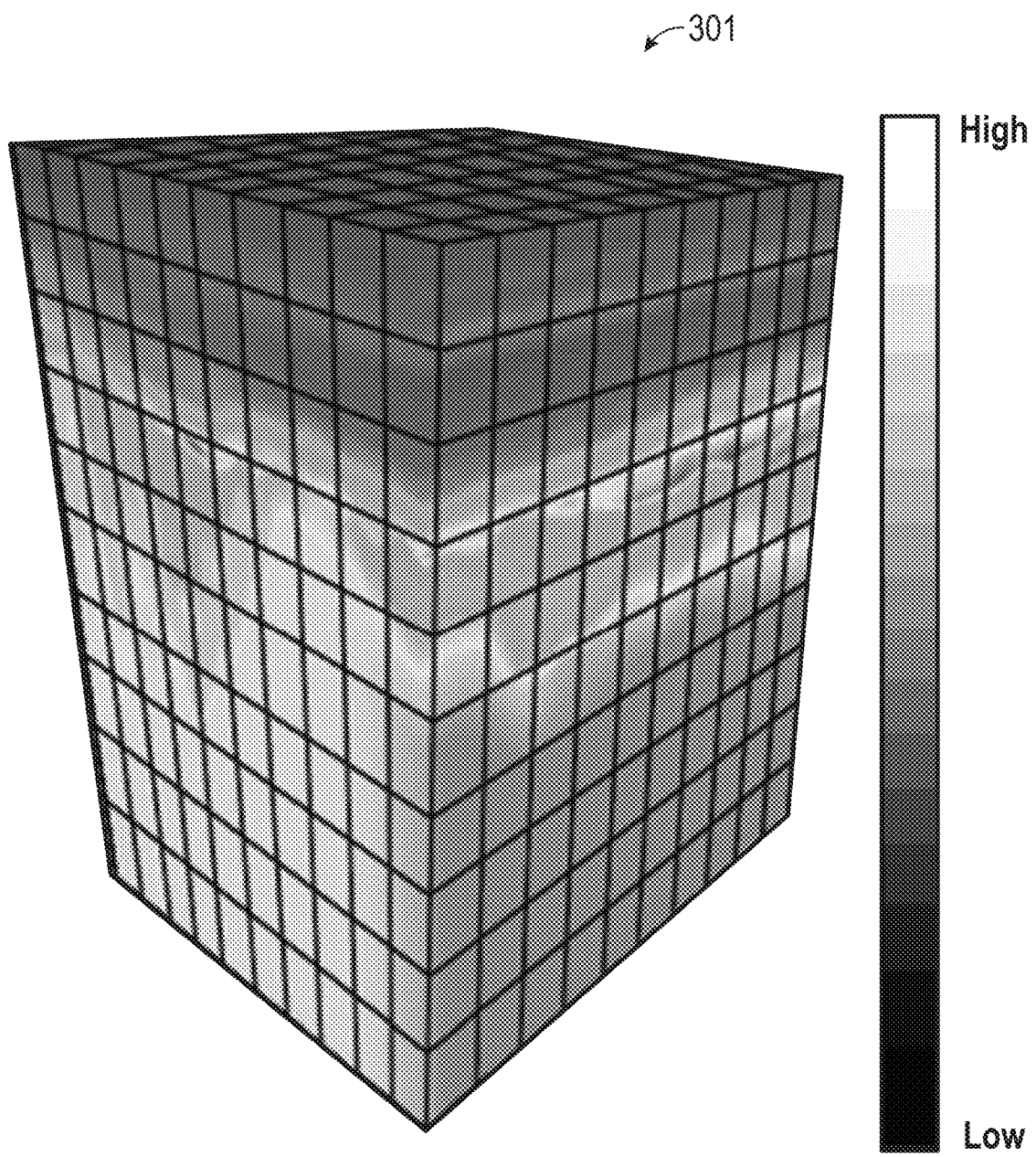
FIG. 3 shows a seismic velocity model in accordance with one or more embodiments.

FIG. 3 shows a seismic velocity model (301) in accordance with one or more embodiments. A seismic velocity model (301) is a representation of seismic velocity at a plurality of locations within a subterranean region of interest (102). Seismic velocity is the speed at which a seismic wave, that may be a pressure-wave or a shear-wave, travel through a medium. Pressures waves are often referred to as "primary-waves" or "p-waves". Shear waves are often referred to a "secondary waves" or "s-waves". Seismic velocities in a seismic velocity model (301) may vary in vertical depth, in one or more horizontal directions, or both. Layers of rock may be created from different materials or created under varying conditions. Each layer of rock may have different physical properties from neighboring layers and these different physical properties may include seismic velocity.

A seismic dataset (200) may be processed to generate a seismic velocity model (301) of the subterranean region of interest (102) or an image of geological discontinuities (112) within the subterranean region of interest (102). The geological discontinuities (112) may be boundaries between geological layers, the boundaries between different pore fluids, faults, fractures or groups of fractures within the rock. The geological discontinuities (112) may delineate a hydrocarbon reservoir (104).

Processing a seismic data set comprises a sequence of steps designed, without limitation, to correct for near surface effects, attenuate noise, compensate of irregularities in the seismic survey geometry, calculate a seismic velocity model (301), image reflectors in the subterranean region, calculate a plurality of seismic attributes to characterize the subterranean region of interest (102), and aid in decisions governing where to drill for hydrocarbons. Processing a seismic dataset (200) may involve combining observed seismic traces (206) drawn from an observed seismic dataset with simulated seismic traces drawn from a simulated seismic dataset.

In accordance with one or more embodiments, a seismic velocity model (301) may be updated by calculating a seismic velocity increment and adding the seismic velocity increment to the seismic velocity model (301) to produce an updated seismic velocity model. Both the seismic velocity model (301) and the seismic velocity increment may comprise a seismic velocity value at each of a plurality of locations within the subterranean region of interest (102). The seismic velocity values may change only with depth below the Earth's surface (116) or they may also vary along one or more horizontal spatial axes. The seismic velocity increment may be determined such that a simulated seismic dataset calculated for the resulting updated seismic velocity model matches an observed seismic dataset (200) more closely than does the simulated seismic dataset calculated for the pre-existing seismic velocity model (301).

The matching of the observed and simulated seismic datasets may be performed, in accordance with one or more embodiments, by forming a plurality of trace pairs with one member of each trace pair being an observed seismic trace (206) drawn from the observed seismic dataset (200) and the other member of the trace pair being a simulated seismic trace drawn from the simulated seismic dataset. Both the observed seismic trace (206) and the simulated seismic trace in each trace pair have the same seismic source location and the same seismic receiver location, i.e., the four-dimensional vector $(x_s, x_r, y_r)$ is the same for both traces in the trace pair.

Figure 4A:
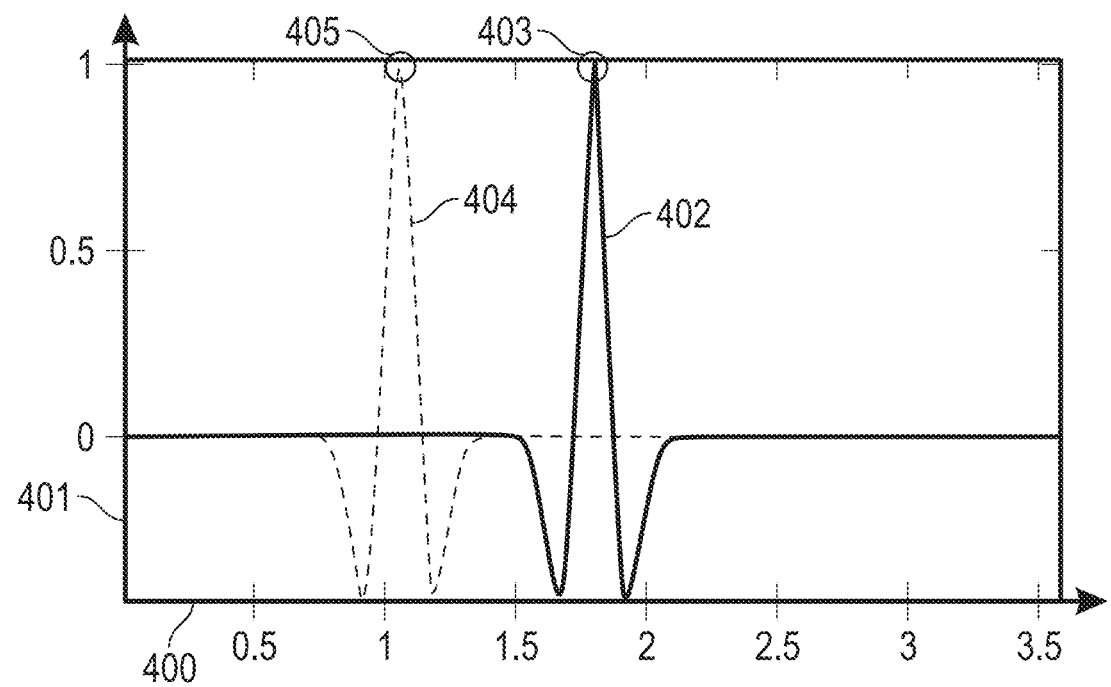
FIGS. 4A-4C show a trace pair, a phase cross-correlation objective function and a penalty function.

The i-th trace pair, $\{d_i, u_i\}$, is depicted in FIG. 4A in accordance with one or more embodiments. In this depiction, the horizontal axis (400) is the recorded time in seconds and the vertical axis (401) is the amplitude of the observed and the simulated trace pair. The observed trace (402) centered at peak (403) and the simulated trace (404) centered at peak (405) do not match well. The simulated trace (404) is time-shifted when compared to the observed trace (402). This misalignment of the two members of the trace pair is typically known as "cycle-skipping". Cycle-skipping may occur when the members of the trace pairs are insufficiently aligned or matched at the beginning of the iterative process or because the seismic velocity model (301) used to simulate the simulated trace (404) differs from the true seismic velocities within the subterranean region of interest (102).

Since the simulated trace (404) occurs earlier in time than the observed trace (402) the seismic velocity model (301) may contain seismic velocity values that are on average faster than true seismic velocities within the subterranean region of interest (102). Conversely, if the seismic velocity model (301) used for simulation contained seismic velocity values that are on average slower than true seismic velocities the simulated trace (404) may arrive later in time than the observed trace (402). Full waveform inversion using the conventional least-squares objective function may suffer from this known cycle-skipping phenomenon.

In accordance with one or more embodiments, an objective function for full waveform inversion can be built based on a phase cross-correlation function in time domain. The phase cross-correlation objective function may be more convex than the conventional least-squares method and may alleviate the cycle-skipping issue.

Figure 4B:
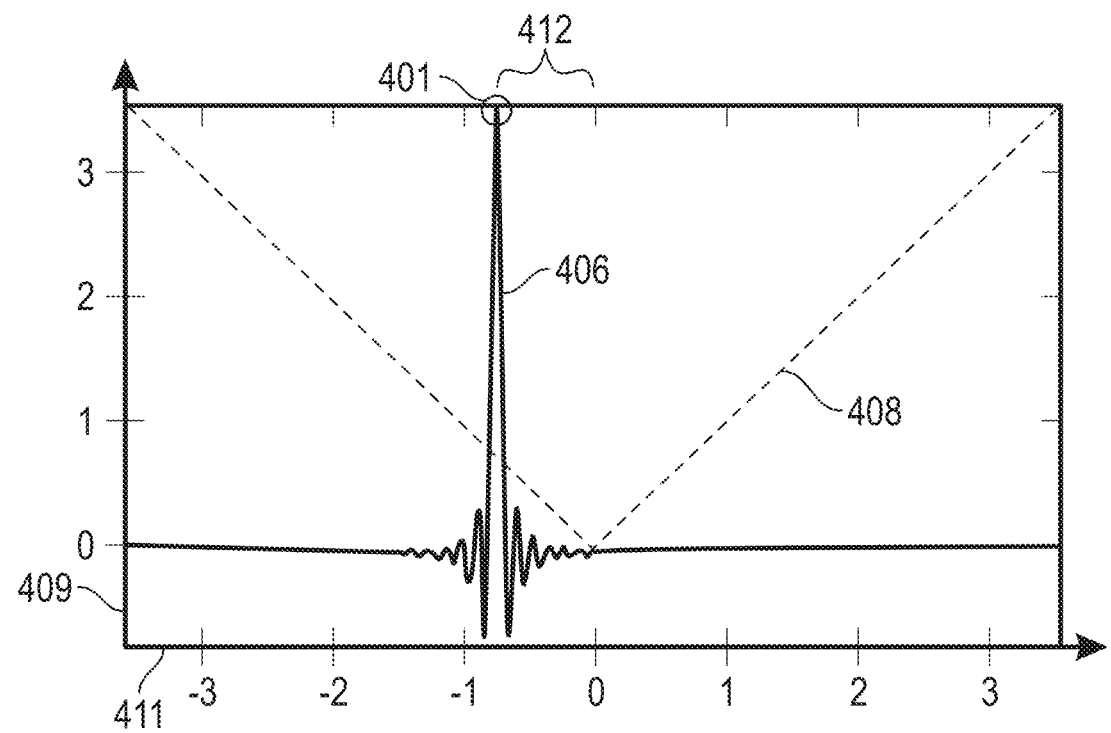

FIG. 4B shows a phase cross-correlation objective function (406) and a penalty function (408) in accordance with one or more embodiments. An objective function $h_i$, may be formed for each trace pair, $\{\hat{d}_i, \hat{u}_i\}$ and may be based on a phase cross-correlation. In accordance with one or more embodiments, a phase cross-correlation may be calculated between the first member and the second member of each trace pair. A conventional cross-correlation, x(t), between a first member of the i-th pair of traces $d_i(t)$ and a second member of the i-th pair of traces $u_i(t)$ may be defined in the time domain as:

$$x(t) = x\text{corr}(d_i, u_i) = \int d_i(t+\tau) u_i(\tau) d\tau. \quad \text{Equation (1)}$$

For real function, such as a trace, the cross-correlation may be written in the frequency domain as:

$$\bar{x}(\omega) = \bar{d}_i^\dagger(\omega) \bar{u}_i(\omega) \quad \text{Equation (2)}$$

where $\bar{x}$, $\bar{d}_i$, and $\bar{d}_i$ are the Fourier transforms of x, $d_i$, and $u_i$, respectively, $\omega$ indicates frequency and $\dagger$ denotes the complex conjugate. The phase cross-correlation may be defined in the frequency domain as:

$$\bar{c}(\omega) = \bar{x}(\omega)/|\bar{x}(\omega)| \quad \text{Equation (3)}$$

where $\bar{c}(\omega)$ is the phase cross-correlation in the frequency domain, and | | denotes the absolute value. $\bar{c}(\omega)$ may be transformed into the time domain using the inverse Fourier transform.

This phase cross-correlation objective function (406) for the two trace segments (402, 404) is depicted in the FIG. 4B as the solid line. The extremum (410) of the phase cross-correlation objective function (406) corresponds to a match between the observed trace (402) and the simulated trace (404) in the trace pair. The extremum (410) occurs at a zero-time shift value (412) of 0.75 seconds, indicating the time shift necessary to align the observed trace (402) and the simulated trace (404) in the trace pair. The time lag or time shift value represents the horizontal axis (411) and the vertical axis (409) represents amplitude. The location of the extremum (410) is not known a priori and calculation of the entire phase cross-correlation objective function (406) for all lags and for all the trace pairs is typically computationally infeasible.

Instead, only the zero-time shift value (412) of the phase cross-correlation objective function (406) and the gradient or slope of the phase cross-correlation objective function (406) is calculated. From this the nearest extremum is found by iteratively determining a seismic velocity increment to be added to the seismic velocity model (301), recalculating the zero-time shift value (412) of the phase cross-correlation objective function (406), and determining a new seismic velocity increment. The iteration terminates when a local extremum is reached. A series of measuring functions could be built as FWI objective functions based on the phase cross-correlation objective function (406) producing a penalized function (408).

In FIG. 4B, a penalty function (408) is plotted in square dots. The penalty function (408) or P(t), may be introduced to produce a modified objective function and broaden the basin of attraction. The modified objective function, $h_i$, may be written in the penalized form as:

$$h_i(d_i, u_i) = \frac{1}{2} \frac{<c|P|c>}{<c|c>} = \frac{1}{2} \frac{\int_{-T}^{T} c^2(t) P(t) dt}{\int_{-T}^{T} c^2(t) dt}. \quad \text{Equation (4)}$$

where $h_i$ is a measuring function, T is the length of the trace and the range of the phase cross-correlation is from −T to T.

Figure 4C:
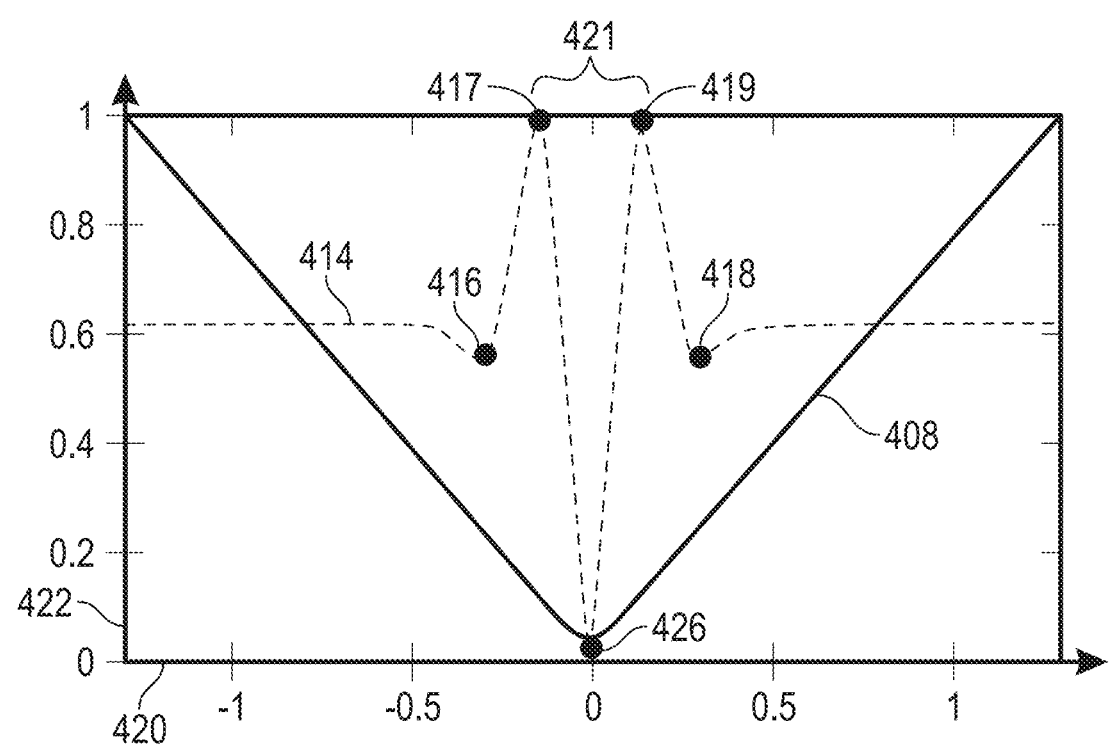

FIG. 4C shows the conventional least-squares objective function (414) in the dotted line, with 3 corresponding local minima (416, 418, 426) and the penalized function (408). The horizontal axis (420) is the time lag between the simulated trace (404) and the observed trace (402). The value of the objective functions are plotted on the vertical axis (422).

For the conventional least-squares objective function (414), if the time-shift falls between the two maxima (417, 419) lying on either side of the extremum (426) then the iterative process will converge to the extremum (426). If the time-shift falls outside the maxima (417, 419) the iterative process will converge at one of the subsidiary minima (416, 418). The range of time-shifts between (416) and (418) may be called the "basin of attraction" (421).

In contrast, the basin of attraction for the penalized function (408) is much broader than the basin of attraction for the objection function for the conventional least-squares method extending, at least, over the range of time lags depicted on the time lag axis (420). Consequently, the iterative process using the penalized function (408) will converge to the extremum (426) even when the initial time-shift between the observed trace (402) and simulated trace (404) is much greater for the penalized function (408).

In accordance with one or more embodiments, the preceding description of the modified or penalized function (408) for a single trace pair may be extended to be a global objective function, h, for all trace pairs by summing the penalized objective function (408) for all members of the plurality of trace pairs:

$$h(d,u) = \Sigma_{i=1}^{N} h_i(d_i, u_i). \quad \text{Equation (5)}$$

where N is the total number of trace-pairs.

In accordance with one or more embodiments, the extremum of the objective function may be determined by forming an adjoint source for each trace pair. For example, the adjoint source of the objective function for the i-th pair of traces $J = h_i(c)$ is obtained by looking at its first order perturbation:

$$\delta J = \langle \delta c | \mathcal{D} h_i \rangle \quad \text{Equation (6)}$$

where $$\mathcal{D} h_i = \frac{dh_i}{dc}$$

is the first order differential of $h_i$ with respect to its variable c and δ denotes first-order perturbation. Since the phase correlation function c is defined in frequency domain, its derivative with respect to the simulated trace (404), $u_i$, can be derived as:

$$\delta J = \langle \delta \mathcal{F} 1\bar{c} | \mathcal{D} h_i \rangle = \langle \mathcal{F} 1 \delta \bar{c} | \mathcal{D} h_i \rangle = \langle \delta \bar{c} | \mathcal{F}^\dagger | \mathcal{D} h_i \rangle \quad \text{Equation (7)}$$

where $\mathcal{F}$ is the Fourier transform operator and we have reversed the order of the linear operators $\mathcal{F}$ and δ. Substituting the definition of $$\bar{c} = \frac{\overline{u_i}^\dagger \overline{d_i}}{|\overline{u_i}^\dagger \overline{d_i}|}$$

in Equation (7) yields:

$$\delta J = \langle \delta \overline{u_i}^\dagger \left| \frac{\overline{d_i}}{|\overline{u_i}^\dagger \overline{d_i}|} \mathcal{F}^\dagger \mathcal{D} h_i \right\rangle - \langle \overline{u_i}^\dagger \delta \overline{u_i} + \overline{u_i} \delta \overline{u_i}^\dagger \left| \frac{\overline{u_i}^\dagger \overline{d_i}}{|\overline{d_i}||\overline{u_i}|^3} \mathcal{F}^\dagger \mathcal{D} h_i \right\rangle \quad \text{Equation (8)}$$

where we have used the identity $|\overline{u_i}^\dagger|^2 = |\overline{u_i}|^2 = \overline{u_i}^\dagger \overline{u_i}$.

Finally, in in accordance with one or more embodiments, the adjoint-source may be written as:

$$|s\rangle = \mathcal{F}^{-1} \left| \frac{\overline{d}}{|\overline{p}^\dagger \overline{d}|} \mathcal{F}^\dagger \mathcal{D} h_i - \overline{p} \text{Re}\left( \frac{\overline{p}^\dagger \overline{d}}{|\overline{d}||\overline{p}|^3} \mathcal{F}^\dagger \mathcal{D} h_i \right) \right\rangle \quad \text{Equation (9)}$$

where we have used the relationship $(\overline{u_i}^\dagger \delta \overline{u_i})^\dagger = \overline{u_i} \delta \overline{u_i}^\dagger$.

In accordance with one or more embodiments, seismic waves excited by the adjoint-sources may be simulated as backward-propagating in time using the seismic velocity model (301) of the subterranean region of interest (102). The seismic velocity increment may be determined from the backward-propagated seismic waves and the simulated forward-propagated in time seismic waves excited by the seismic sources (106). In accordance with one or more embodiments, the seismic velocity increment may be determined using the zero-lag cross-correlation between the simulated backward-propagated seismic waves and the simulated forward-propagated seismic waves. The seismic velocity increment may be multiplied by a scalar before it is added to the seismic velocity model (301) to produce an updated seismic velocity model. The scalar may be determined so that seismic waves simulated in the updated seismic velocity model may generate an extremum of the objective function.

The preceding description has described a case where the extremum is a maximum of the objective function. However, one of ordinary skill in the art will readily appreciate that the objective function may be formed, for example, by multiplying the exemplary objective function by a negative number, or subtracting the exemplary objective function from a large positive number, so that the extremum is a minimum without departing from the scope of the invention.

Figure 5:
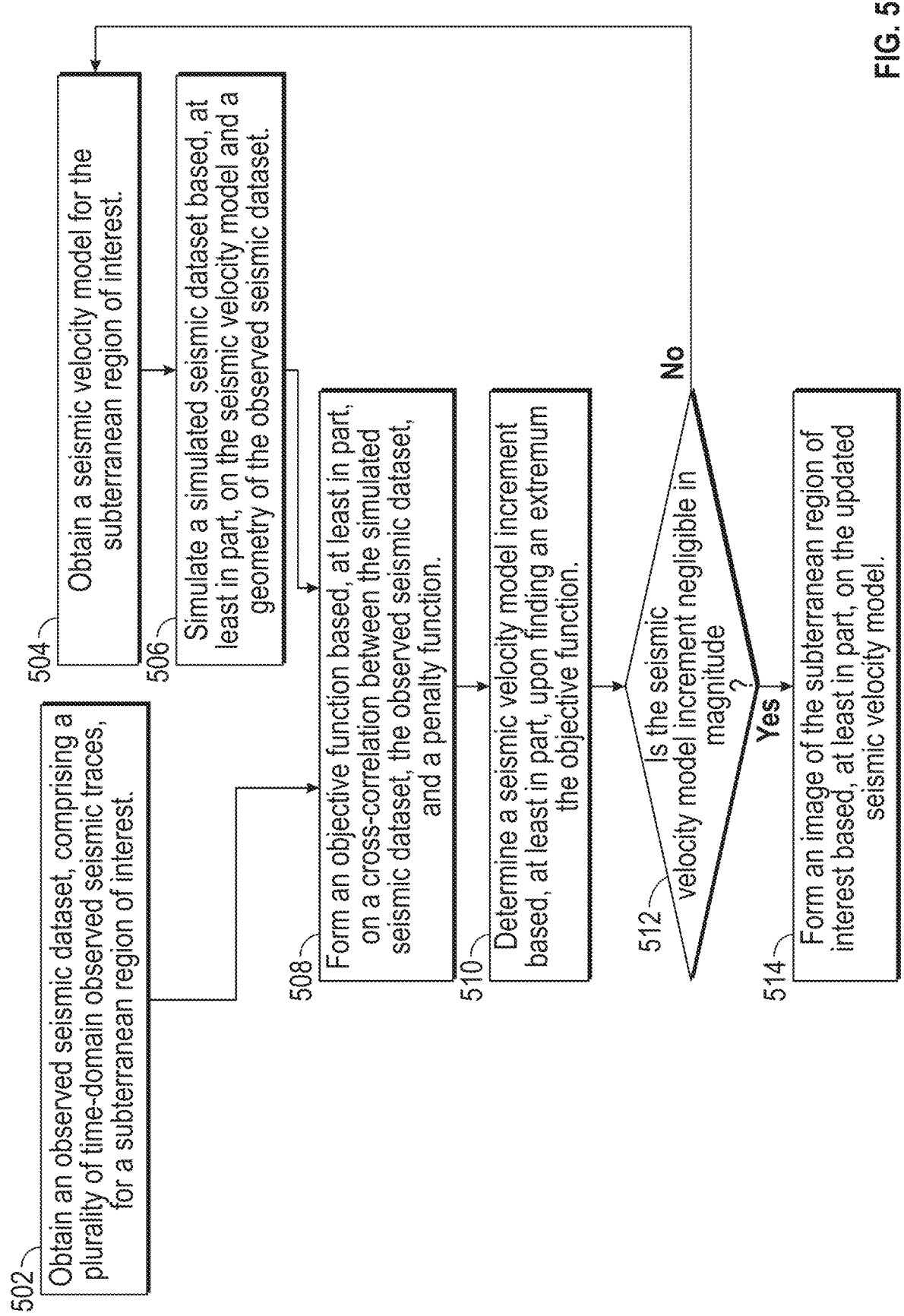
FIG. 5 shows a flowchart in accordance with one or more embodiments.

FIG. 5 shows a flowchart in accordance with one or more embodiments. In Step 502 an observed seismic dataset (200), comprising a plurality of time-domain observed seismic traces (206), for a subterranean region of interest (102) is obtained. The observed seismic dataset (200) may contain a plurality of observed seismic traces (206) recorded for each of a plurality of seismic source excitations. Typically, there may be hundreds of thousands of observed seismic traces (206) for each seismic source excitation and tens of thousands of seismic source excitations in an observed seismic dataset (200).

In Step 504 a seismic velocity model (301) for the subterranean region of interest (102) is obtained. The seismic velocity model (301) may be obtained from acoustic well logs or well seismic datasets. The seismic velocity model (301) may be determined from the observed seismic dataset obtained in Step 502 using approximate methods such as normal moveout analysis, Kirchhoff velocity analysis, or seismic velocity tomography. The seismic velocity model (301) may be obtained from another observed seismic dataset for the subterranean region of interest (102).

In Step 506, a simulated seismic dataset may be simulated based, at least in part, on the seismic velocity model and a geometry of the observed seismic dataset. Simulating the seismic dataset may involve solving the elastic wave equation or an approximation to the elastic for a plurality of seismic source locations drawn from the observed seismic dataset and recording the simulated ground motion for a plurality of seismic receiver locations drawn from the observed seismic dataset.

In Step 508, in accordance with one or more embodiments, an objective function is formed based, at least in part, on a phase cross-correlation between the simulated seismic dataset, the observed seismic dataset, and a penalty function. Step 508 is described below in more detail in connection with FIG. 6.

In Step 510, in accordance with one or more embodiments, a seismic velocity model increment may be determined based, at least in part, upon finding an extremum the objective function. Step 510 is described later in more detail in connection with FIG. 6. In some embodiments, the extremum may be a maximum and in other embodiments the extremum may be a minimum. The determination of the seismic velocity model increment may be performed using gradient-based local optimization methods such as, without limitation, a conjugate-gradient method, a quasi-Newton method, or an I-BFGS method.

In Step 512, the magnitude of the seismic velocity model increment may be determined. If the magnitude is negligible or if the magnitude falls below a predetermined threshold, the process for determining the seismic velocity model may be considered to have converged and the flowchart may proceed to Step 514. However, if the process has not converged then the seismic velocity model determined in Step 504 may be updated by combining the seismic velocity model increment and the seismic velocity model previously obtained in Step 504.

In Step 514, an image of the subterranean region of interest (102) may be formed in accordance with one or more embodiments. The image may be formed by numerically simulating the forward-propagation of seismic waves generated by the seismic source (106) at a plurality of locations through an updated seismic velocity model and numerically simulating the backward-propagation of seismic waves observed at the plurality of seismic receivers (120) through an updated seismic velocity model. Further, the image may be formed by combining the forward-propagated seismic waves and the backward-propagated seismic waves at a plurality of positions within the subterranean region of interest (102) using an imaging condition. In accordance with one or more embodiments, the imaging condition may be a zero-lag cross-correlation coefficient.

Figure 6:
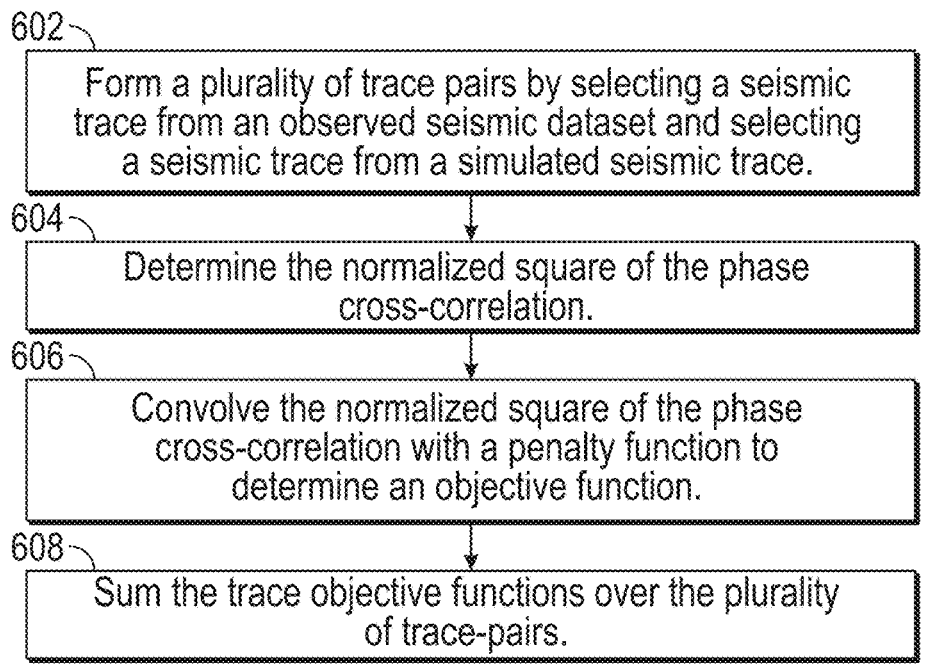
FIG. 6 shows a flowchart in accordance with one or more embodiments.

FIG. 6 shows a flowchart describing the formation of an objective function in accordance with one or more embodiments. In Step 602, a plurality of trace pairs may be formed by selecting a seismic trace from the observed seismic dataset and selecting a seismic trace from the simulated seismic trace. Both the observed trace (402) and the simulated trace (404) in each trace pair share the same seismic source location and the same seismic receiver location.

In Step 604, the phase cross-correlation between the first member of the pair of traces with the second member of the pair of traces may be determined using Equation (3). Equation (3) represents the normalized square of the phase cross-correlation transformed into the frequency domain. The frequency domain phase cross-correlation can be transformed into the time domain using the inverse Fourier transform.

In Step 606, the normalized square of the phase cross-correlation may be convolved with a penalty function to determine a modified trace pair objective function. The penalty function, in equation (4), may have a minimum value and have values that increase with separation from the sample with this minimum value. The penalty function is designed to broaden the basin of attraction and may have one or many functional forms familiar to those of ordinary skill in the art, such as a Gaussian, a binomial distribution, or a Poisson distribution.

In accordance with one or more embodiments, the preceding description of the modified objective function for a single trace pair may be extended to be a global objective function for all trace pairs. In Step 608, the trace pair objective functions may be summed over the plurality of trace pairs in accordance with equation (5).

Figure 7:
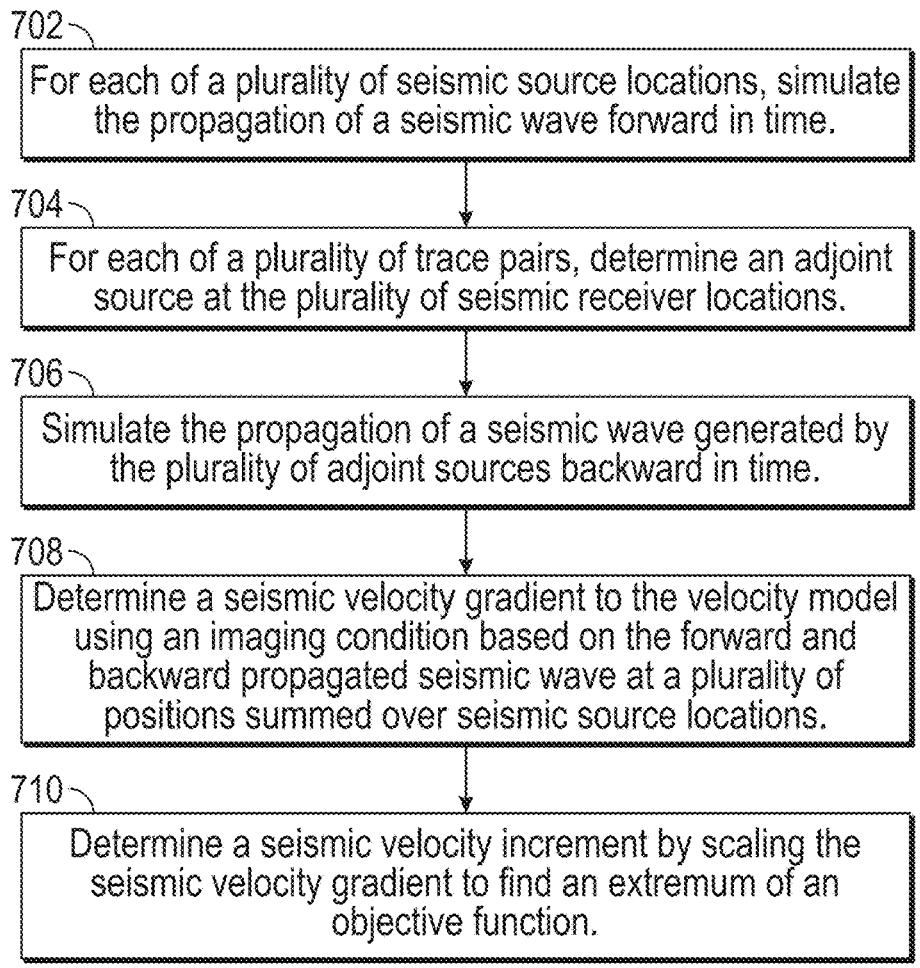
FIG. 7 shows a flowchart in accordance with one or more embodiments.

FIG. 7 shows a flowchart for updating the seismic velocity model (301), in accordance with one or more embodiments. In Step 702, the seismic wave excited by the seismic source (106) at a plurality of seismic source location may be simulated propagating forward in time. The simulation may be based, at least in part, on solving a wave equation for each of the seismic source locations. The wave equation may be the elastic wave equation or an approximation to the elastic wave equation In Step 704, the adjoint source for each member of the plurality of time-windowed trace pairs may be determined at the location of the seismic receiver corresponding to the trace pair. In accordance with one or more embodiments, the adjoint source may be based, at least in part, on the difference between a simulated seismic trace and an observed seismic trace (206). Further, the adjoint source may be determined using equation (9).

In Step 706 the seismic waves excited by the plurality of adjoint source may be simulated propagating backward in time. In accordance with one or more embodiment, the backward in time simulation may be performed sequentially for the adjoint source formed from each time windowed pair. In accordance with other embodiments, the backward in time simulation may be performed simultaneously for the adjoint sources associated for all the time-windowed trace pairs determined from a single trace pair. In still other embodiments, the backward in time simulation may be performed simultaneously for all the adjoint source determined from all the trace pairs depending on a single activation of a seismic source (106).

In Step 708, a gradient of the seismic velocity model may be determined by applying an imaging condition combining the forward-propagated and backward-propagated simulated seismic waves at a plurality of positions in the subterranean region of interest. The seismic velocity gradient may be calculated by summing the contributions to seismic velocity gradient coming from each activation of the seismic source (106) at a plurality of locations.

In Step 710, in accordance with one or more embodiments, a seismic velocity increment may be determined by scaling the seismic velocity gradient to find an extremum of an objective function. In some embodiments, the extremum may be a maximum and in other embodiments the extremum may be a minimum. The scaling may include multiplication of the seismic velocity gradient by a scalar. The scaling may further include spatial smoothing and/or low-pass spatial filtering in one, two, or three spatial dimensions.

Figure 8A:
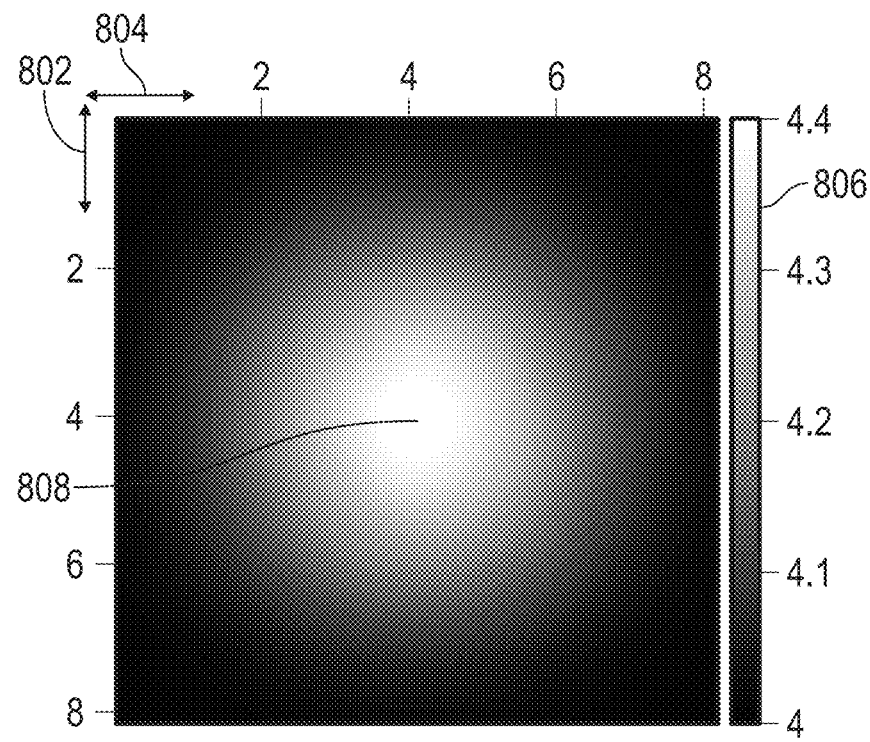
FIGS. 8A-8D show an example application in accordance with one or more embodiments.

FIGS. 8A-8D show some intermediate step of and exemplary application of the workflow depicted in FIG. 5 to a synthetic seismic velocity model. FIG. 8A depicts a vertical cross-section through a seismic velocity model for a subterranean region of interest (102). The vertical axis (802) delineates depth and the horizontal axis (804) delineates horizontal distance. The grayscale (806) represents seismic velocity that ranges between 4-4.4 km/s. In the example shown in FIG. 8A the seismic velocity model varies smoothly from a maximum velocity near the center of the model (808) to a minimum velocity at the boundary of the region spanned by the seismic velocity model. In this example the initial seismic velocity model, obtained in Step 504 is a homogenous seismic velocity model with a uniform seismic velocity of 4.0 km/s.

A simulated seismic dataset has been determined for the synthetic seismic shown in FIG. 8A. Although simulated, this simulated seismic dataset performs the role of an observed seismic dataset in this example, and we will refer to it as "observed" seismic dataset in the description of FIGS. 8A-8D. The "observed" seismic dataset is simulated using an array of simulated seismic sources at a plurality of locations at the top of the seismic velocity model. Each simulated seismic source is excited in turn and the simulated seismic waves are recorded at a plurality of simulated seismic receivers located at the bottom of the seismic velocity model.

Figure 8B:
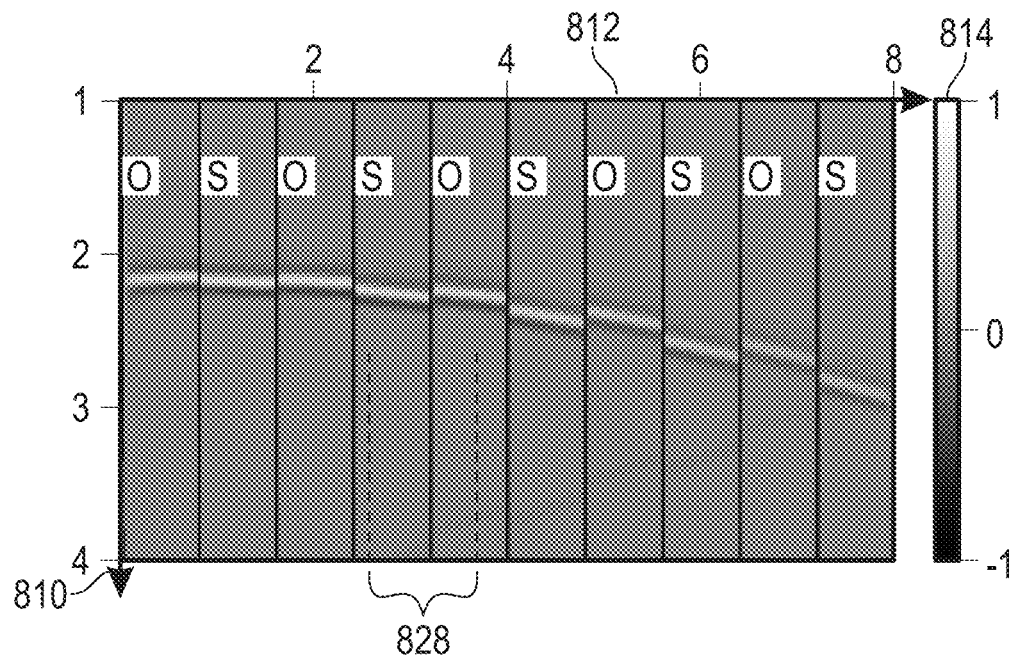

FIG. 8B depicts a portion of the "observed" seismic dataset interleaved with a simulated seismic dataset for the homogeneous seismic velocity model. The portions of both the "observed" and simulated seismic datasets are the seismic waves recorded by the plurality of receivers at a range of horizontal locations and generated by a seismic source (106) activated at a single location. Portions of the "observed" seismic dataset are marked "O" and are interleaved with portions of the simulated seismic dataset marked "S". Time is represented on the vertical axis (810) and the seismic receiver (120) location is represented on the horizontal axis (812). The normalized amplitude of the "observed" and simulated seismic dataset are represented by the grayscale (814). FIG. 8B depicts a misalignment (828) of the two members of the trace pair.

Figure 8C:
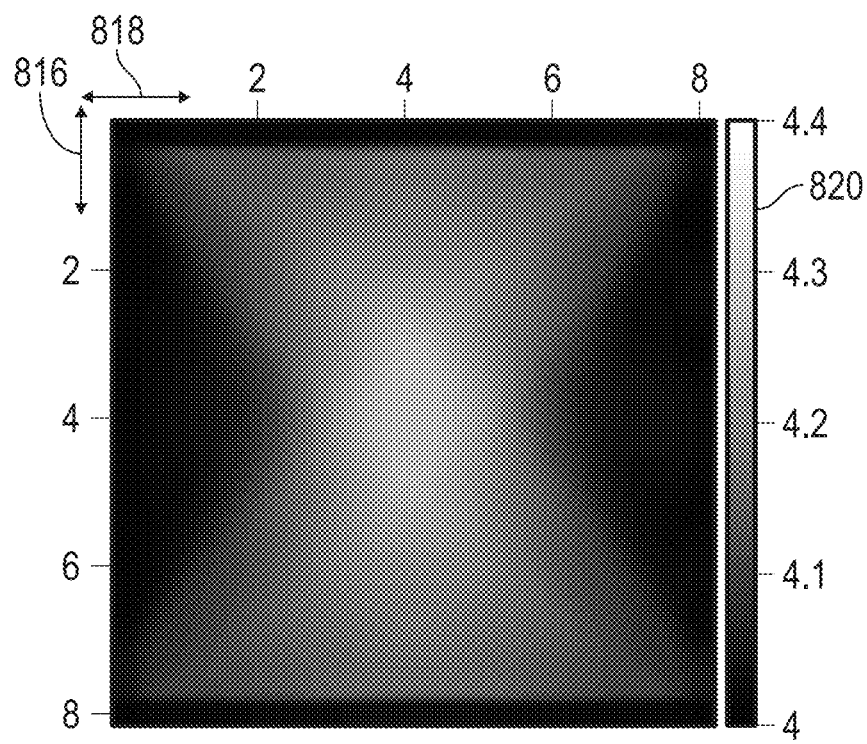

FIG. 8C depicts a vertical cross-section through a seismic velocity model for a subterranean region of interest (102) resulting from executing the workflow shown in FIG. 5. The vertical axis (816) delineates depth and the horizontal axis (818) delineates horizontal distance. The grayscale (820) represents seismic velocity that ranges between 4-4.4 km/s. In some cases, the updated velocity model may be found by determining a single iteration of the workflow shown in FIG. 5. In other cases, multiple iterations of the workflow shown in FIG. 5 and multiple determinations of a seismic velocity model increment may be required to determine the updated velocity model. Each seismic velocity model increment may be determined using a gradient-based local optimization method, such as, but not limited to conjugate-gradient method, or quasi-Newton. I-BFGS method.

Figure 8D:
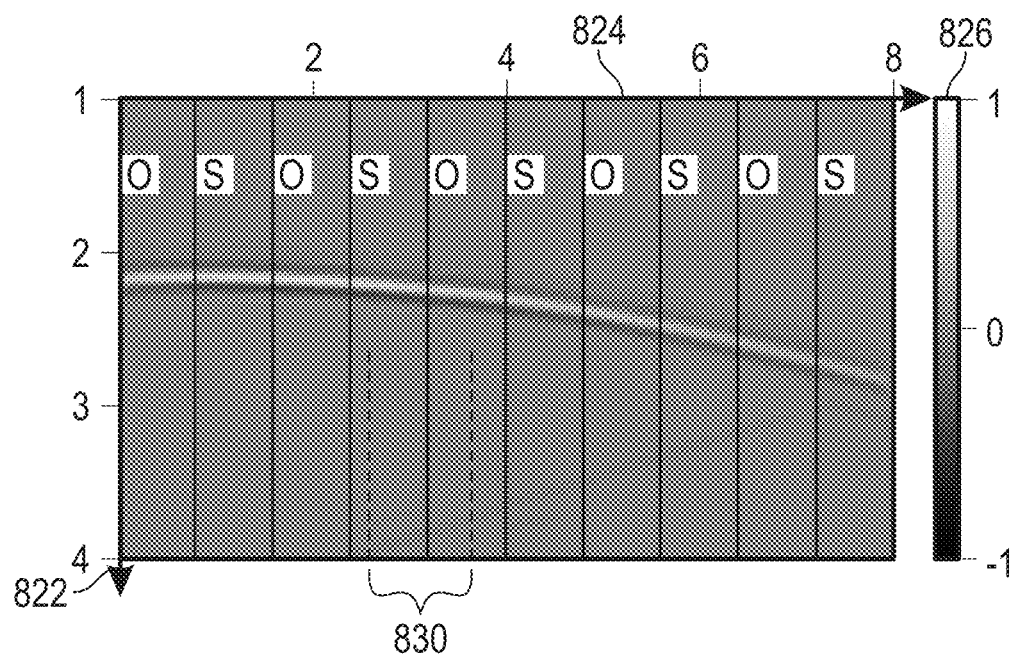
Figure 9:
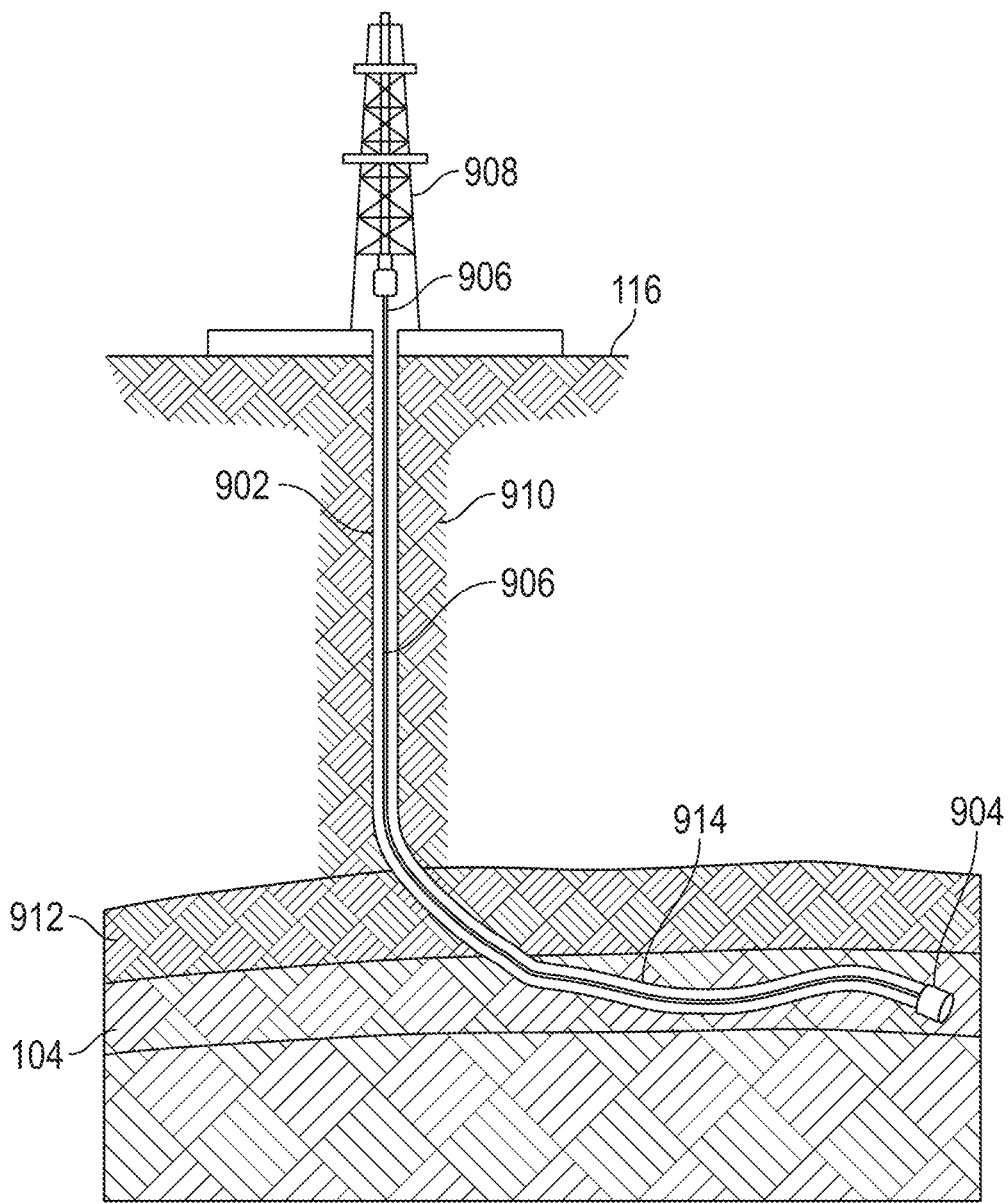
FIG. 9 shows a system in accordance with one or more embodiments.

FIG. 8D depicts a portion of the "observed" seismic dataset interleaved with a simulated seismic formed from the updated seismic velocity model shown in FIG. 8C and described in Step 514. The portions of both the "observed" and simulated seismic datasets are the seismic waves recorded by the plurality of receivers at a range of horizontal locations and generated by a seismic source (106) activated at a single location. As in FIG. 8B, portions of the "observed" seismic dataset are marked "O" and are interleaved with portions of the simulated seismic dataset marked "S". Time is represented on the vertical axis (822) and the seismic receiver (120) location is represented on the horizontal axis (824). The normalized amplitude of the "observed" and simulated seismic dataset are represented by the grayscale (826). FIG. 8D depicts an alignment (830) of the two members of the trace pair. The alignment of the trace pair demonstrates a successful seismic velocity model FIG. 9 illustrates systems in accordance with one or more embodiments. As shown in FIG. 9, a well (902) may be drilled by a drill bit (904) attached by a drillstring (906) to a drill rig (908) located on the Earth's surface (116). The well may traverse a plurality of overburden layers (910) and one or more cap-rock layers (912) to a hydrocarbon reservoir (104). In accordance with one or more embodiments, the updated seismic velocity model, may be used to plan and perform the curved well path (914). An image of the subterranean region of interest may formed using the updated seismic velocity model and the observed seismic dataset, shown in FIG. 8B, and the curved well path (914) may be planned based, at least in part, on the image.

Figure 10:
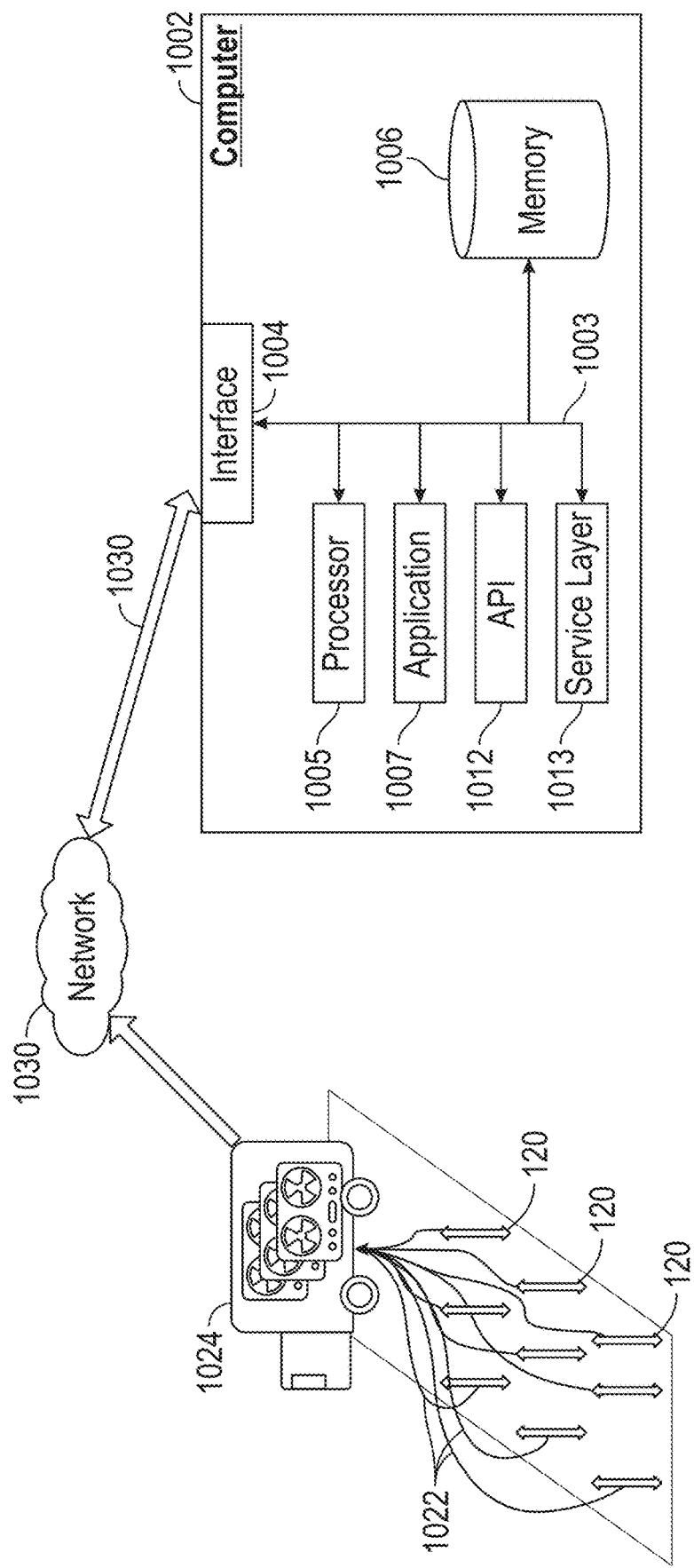
FIG. 10 shows a system in accordance with one or more embodiments.

FIG. 10 shows a seismic recording and processing system, in accordance with one or more embodiments. The data recorded by a plurality of seismic receivers (120) may be transmitted to a seismic recording facility (1024) located in the neighborhood of the seismic survey (100). The seismic recording facility may be one or more seismic recording trucks (1024). The plurality of seismic receivers (120) may be in digitally or analogic telecommunication with the seismic recording facility (1024). The telecommunication may be performed over telemetry channels (1022) that may be electrical cables, such as coaxial cables, or may be performed wireless using wireless systems, such as Wi-Fi or Bluetooth. Digitization of the seismic data may be performed at each seismic receiver (120), or at the seismic recording facility (1024), or at an intermediate telemetry node (not shown) between the seismic receiver (120) and the seismic recording facility (1024).

The seismic data may be recorded at the seismic recording facility (1024) and stored on non-transitory computer memory. The computer memory may be one or more computer hard-drives, or one or more computer memory tapes, or any other convenient computer memory media familiar to one skilled in the art. The seismic data may be transmitted to a computer (1002) for processing. The computer (1002) may be located in or near the seismic recording facility (1024) or may be located at a remote location, that may be in another city, country, or continent. The seismic data may be transmitted from the seismic recording facility (1024) to a computer (1002) for processing. The transmission may occur over a network (1030) that may be a local area network using an ethernet or Wi-Fi system, or alternatively the network (1030) may be a wide area network using an internet or intranet service. Alternatively, seismic data may be transmitted over a network (1030) using satellite communication networks. Most commonly, because of its size, seismic data may be transmitted by physically transporting the computer memory, such as computer tapes or hard drives, in which the seismic data is stored from the seismic recording facility (1024) to the location of the computer (1002) to be used for processing.

FIG. 10 further depicts a block diagram of a computer system (1002) used to provide computational functionalities associated with described algorithms, methods, functions, processes, flows, and procedures as described in this disclosure, according to one or more embodiments. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a GUI.

The computer (1002) can serve in a role as a client, network component, a server, a database or other persistency, or any other component (or a combination of roles) of a computer system for performing the subject matter described in the instant disclosure. The illustrated computer (1002) is communicably coupled with a network (1030). In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002)) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or another suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004 includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1230). For example, memory (1206) can be a database storing data consistent with this disclosure. Although illustrated as a single memory (1206) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), wherein each computer (1002) communicates over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of forming an image of a subterranean region of interest, comprising:
   obtaining an observed seismic dataset for the subterranean region of interest, wherein the observed seismic dataset comprises a plurality of seismic source locations, a plurality of receiver locations, and an observed seismic trace for each pair of seismic source location and seismic receiver location;
   obtaining a seismic velocity model for the subterranean region of interest;
   simulating, using a computer processor, a simulated seismic dataset wherein the simulated seismic dataset comprises a simulated seismic trace for each pair of seismic source location and seismic receiver location based, at least in part, on the seismic velocity model;
   forming, using the computer processor, a plurality of trace pairs from the simulated seismic dataset and the observed seismic dataset, wherein each of the plurality of trace pairs comprises an observed seismic trace and a simulated seismic trace;
   forming, using the computer processor, an objective function based, at least in part, on a penalty function and a cross-correlation between the observed seismic trace and the simulated seismic trace of each of the plurality of trace pairs;
   finding, using the computer processor, an extremum of the objective function;
   determining, using the computer processor, a seismic velocity increment based, at least in part, on the extremum;
   forming, using the computer processor, an updated seismic velocity model by combining the seismic velocity increment and the seismic velocity model; and
   forming, using the computer processor, the image of the subterranean region of interest based, at least in part, on the updated seismic velocity model.

2. The method of claim 1,
   wherein forming the objective function comprises:
      calculating a phase cross-correlation function between a first member of each trace pair and a second member of each trace pair;
      determining a trace objective function for each trace based, at least in part, on a normalized integral of a square of the phase cross-correlation function for each trace pair multiplied by the penalty function; and
      summing the trace objective function over the plurality of trace pairs.

3. The method of claim 1, wherein forming the plurality of trace pairs comprises:
   selecting a common seismic source location and a common receiver location; and
   selecting, as a first member of each trace pair, the observed seismic trace from the observed seismic dataset and selecting, as a second member of each trace pair, the simulated seismic trace from the simulated seismic dataset, wherein both the first member of each trace pair and the second member of each trace pair have the common seismic source location and the common receiver location.

4. The method of claim 1, wherein the penalty function has an absolute magnitude that increases monotonically with lag from a minimum value.

5. The method of claim 1, wherein determining the seismic velocity increment comprises:
   simulating a forward propagated seismic wave for at least one of the plurality of seismic source locations;
   determining an adjoint source for at least one of the plurality of trace pairs based, at least in part, on a difference between the observed seismic trace and the simulated seismic trace;
   simulating, for at least one of the plurality of trace pairs, a backward propagated seismic wave generated by the adjoint source;
   determining at least one seismic velocity gradient increment using an imaging condition based, at least in part, on the forward propagated seismic wave and the backward propagated seismic wave;
   obtaining a seismic velocity gradient based, at least in part, on the at least one seismic velocity gradient increment; and
   determining the seismic velocity increment by scaling the seismic velocity gradient based, at least in part, on the extremum of the objective function.

6. The method of claim 5, wherein obtaining the seismic velocity gradient comprises performing a gradient-based local search procedure based, at least in part, on a plurality of seismic velocity gradient increments.

7. The method of claim 1, further comprising:
   identifying a portion of the subterranean region of interest with a likelihood of containing hydrocarbons based, at least in part, on the image of the subterranean region of interest;
   determining a well path through the subterranean region of interest based, at least in part, on the identified portion of the subterranean region of interest; and
   drilling the well path using a drilling system.

8. A non-transitory computer readable medium storing instructions executable by a computer processor, the instructions comprising functionality for:
   obtaining an observed seismic dataset for a subterranean region of interest, wherein the observed seismic dataset comprises a plurality of seismic source locations, a plurality of receiver locations, and an observed seismic trace for each pair of seismic source location and seismic receiver location;
   obtaining a seismic velocity model for the subterranean region of interest;
   simulating, using a computer processor, a simulated seismic dataset wherein the simulated seismic dataset comprises a simulated seismic trace for each pair of seismic source location and seismic receiver location based, at least in part, on the seismic velocity model;
   forming, using the computer processor, a plurality of trace pairs from the simulated seismic dataset and the observed seismic dataset, wherein each of the plurality of trace pairs comprises an observed seismic trace and a simulated seismic trace;
   forming, using the computer processor, an objective function based, at least in part, on a penalty function and a cross-correlation between the observed seismic trace and the simulated seismic trace of each of the plurality of trace pairs;

finding, using the computer processor, an extremum of the objective function;

determining, using the computer processor, a seismic velocity increment based, at least in part, on the extremum;

forming, using the computer processor, an updated seismic velocity model by combining the seismic velocity increment and the seismic velocity model; and forming, using the computer processor, an image of the subterranean region of interest based, at least in part, on the updated seismic velocity model.

9. The non-transitory computer readable medium of claim 8, wherein forming an objective function comprises:
calculating a phase cross-correlation function between a first member of each trace pair and a second member of each trace pair;
determining a trace objective function for each trace based, at least in part, on a normalized integral of a square of the phase cross-correlation function for each trace pair multiplied by the penalty function; and
summing the trace objective function over the plurality of trace pairs.

10. The non-transitory computer readable medium of claim 8, wherein forming a trace pair from the simulated seismic dataset and the observed seismic dataset, comprises:
selecting a common seismic source location and a common receiver location; and
selecting, as a first member of each trace pair, the observed seismic trace from the observed seismic dataset and selecting, as a second member of each trace pair, the simulated seismic trace from the simulated seismic dataset, wherein both the first member of each trace pair and the second member of each trace pair have the common seismic source location and the common receiver location.

11. The non-transitory computer readable medium of claim 8, wherein the penalty function has an absolute magnitude that increases monotonically with lag from a minimum value.

12. The non-transitory computer readable medium of claim 8, wherein determining the seismic velocity increment comprises:
simulating a forward propagated seismic wave for at least one of the plurality of seismic source locations;
determining an adjoint source for at least one of the plurality of trace pairs based, at least in part, on a difference between the observed seismic trace and the simulated seismic trace;
simulating, for at least one of the plurality of trace pairs, a backward propagated seismic wave generated by the adjoint source;
determining at least one seismic velocity gradient increment using an imaging condition based, at least in part, on the forward propagated seismic wave and the backward propagated seismic wave;
obtaining a seismic velocity gradient based, at least in part, on the at least one seismic velocity gradient increment; and
determining the seismic velocity increment by scaling the seismic velocity gradient based, at least in part, on the extremum of the objective function.

13. The non-transitory computer readable medium of claim 12, wherein obtaining the seismic velocity gradient comprises performing a gradient-based local search procedure based, at least in part, on a plurality of seismic velocity gradient increments.

14. The non-transitory computer readable medium of claim 8, the instructions further comprising functionality for:
identifying a portion of the subterranean region of interest with a likelihood of containing hydrocarbons based, at least in part, on the image of the subterranean region of interest; and
determining a well path through the subterranean region of interest based, at least in part, on the identified portion of the subterranean region of interest.

15. A system for forming an image of a subterranean region of interest, comprising:
a seismic source to emit a radiated seismic wave;
a plurality of seismic receivers for detecting and recording an observed seismic dataset generated by the radiated seismic wave; and
a seismic processor configured to:
obtain an observed seismic dataset for the subterranean region of interest, wherein the observed seismic dataset comprises a plurality of seismic source locations, a plurality of receiver locations, and an observed seismic trace for each pair of seismic source location and seismic receiver location;
obtain a seismic velocity model for the subterranean region of interest;
simulate a simulated seismic dataset wherein the simulated seismic dataset comprises a simulated seismic dataset wherein the simulated seismic dataset comprises a simulated seismic trace for each pair of seismic source location and seismic receiver location based, at least in part, on the seismic velocity model;
form a plurality of trace pairs from the simulated seismic dataset and the observed seismic dataset, wherein each of the plurality of trace pairs comprises an observed seismic trace and a simulated seismic trace;
form an objective function based, at least in part, on a penalty function and a cross-correlation between the observed seismic trace and the simulated seismic trace of each of the plurality of trace pairs;
find an extremum of the objective function;
determine a seismic velocity increment based, at least in part, on the extremum;
form an updated seismic velocity model by combining the seismic velocity increment and the seismic velocity model; and
form the image of the subterranean region of interest based, at least in part, on the updated seismic velocity model.

16. The system of claim 15, wherein forming the objective function comprises:
calculating a phase cross-correlation function between a first member of each trace pair and a second member of each trace pair;
determining a trace objective function for each trace based, at least in part, on a normalized integral of a square of the phase cross-correlation function for each trace pair multiplied by the penalty function; and
summing the trace objective function over the plurality of trace pairs.

17. The system of claim 15, wherein forming the plurality of trace pairs comprises:
selecting a common seismic source location and a common receiver location; and selecting, as a first member of each trace pair, the observed seismic trace from the observed seismic dataset and selecting, as a second member of each trace pair, the simulated seismic trace from the simulated seismic dataset, wherein both the first member of each trace pair and the second member of each trace pair have the common seismic source location and the common receiver location.

18. The system of claim 15, wherein the penalty function has an absolute magnitude that increases monotonically with lag from a minimum value.

19. The system of claim 15, wherein determining a seismic velocity increment comprises:
simulating a forward propagated seismic wave for at least one of the plurality of seismic source locations;
determining an adjoint source for at least one of the plurality of trace pairs based, at least in part, on a difference between the observed seismic trace and the simulated seismic trace;
simulating, for at least one of the plurality of trace pairs, a backward propagated seismic wave generated by the adjoint source;
determining at least one seismic velocity gradient increment using an imaging condition based, at least in part, on the forward propagated seismic wave and the backward propagated seismic wave;
obtaining a seismic velocity gradient based, at least in part, on the at least one seismic velocity gradient increment; and
determining the seismic velocity increment by scaling the seismic velocity gradient based, at least in part, on the extremum of the objective function.

20. The system of claim 15, wherein the seismic processor is further configured to:
identify a portion of the subterranean region of interest with a likelihood of containing hydrocarbons based, at least in part, on the image of the subterranean region of interest; and
determine a well path through the subterranean region of interest based, at least in part, on an identified portion of the subterranean region of interest.

* * * * *